United States Patent [19]

Shiraogawa et al.

[11] Patent Number: 5,343,305
[45] Date of Patent: Aug. 30, 1994

[54] MULTIPLE ADDRESSING FACSIMILE SYSTEM

[75] Inventors: Michio Shiraogawa; Hiroshi Konishi, both of Tokyo, Japan

[73] Assignees: Oki Electric Industry Co., Ltd.; Rikei Corp., both of Tokyo, Japan

[21] Appl. No.: 861,854

[22] PCT Filed: Oct. 25, 1991

[86] PCT No.: PCT/JP91/01461

§ 371 Date: Jun. 18, 1992

§ 102(e) Date: Jun. 18, 1992

[87] PCT Pub. No.: WO92/08312

PCT Pub. Date: May 14, 1992

[30] Foreign Application Priority Data

Oct. 25, 1990 [JP] Japan .................... 2-287589
Oct. 25, 1990 [JP] Japan .................... 2-287590

[51] Int. Cl.$^5$ .................................... H04N 1/00
[52] U.S. Cl. ..................... 358/407; 340/825.03; 379/100
[58] Field of Search ............ 358/400, 401, 405, 407, 358/425, 434, 435, 436, 439, 440; 340/700, 825.03; 375/59, 75; 379/53, 54, 90, 100; 395/114

[56] References Cited

U.S. PATENT DOCUMENTS

| Re. 32,905 | 4/1989 | Baran .................... 370/104 |
| 4,532,554 | 7/1985 | Skala .................... 358/257 |
| 4,622,682 | 11/1986 | Kimakura .................... 375/58 |
| 4,881,129 | 11/1989 | Mitsuhashi . | |
| 4,939,772 | 7/1990 | Goto . | |
| 4,980,677 | 12/1990 | Hotta et al. .................... 340/825.06 |

FOREIGN PATENT DOCUMENTS

| 44-6923 | 3/1969 | Japan . |
| 57-93772 | 6/1982 | Japan . |
| 58-215163 | 12/1983 | Japan . |
| 61-148942 | 7/1986 | Japan . |
| 62-254537 | 11/1987 | Japan . |
| 63-10654 | 1/1988 | Japan . |
| 2089620 | 6/1982 | United Kingdom . |

OTHER PUBLICATIONS

"Facsimile for Disaster Prevention Radio Communications System", Gotoh et al., vol. 55, No. 1, Oki Denki Kenkyu Kaihatsu 137, pp. 23–26.

NHK Laboratories Note, No. 315, Mar., 1985, "Some Experiments On A Facsimile Broadcasting System Multiplexed With Television", Yoshida (pp. 1–13).

IEEE 1990 International Conference On Consumer Electronics, Jun. 6–8, 1990, pp. 308–309, "Multi-Address Facsimile System Using Communication Satellite", Yasumoto et al.

*Primary Examiner*—Bentsu Ro
*Attorney, Agent, or Firm*—Spencer, Frank & Schneider

[57] ABSTRACT

A multiple addressing station transmits a facsimile signal via a communications satellite, using the multiple address communications mode. In this case, the multiple addressing station transmits a facsimile signal via at least one channel of multiple audio channels ch1, ch2 of a satellite communications circuit. This facsimile signal is received by a satellite communications receiver of a terminal station. At the terminal station, the received facsimile signal is sent to a switching control device, and at this switching control device, the facsimile signal and a control signal are sent to a facsimile device by the switching control. The facsimile device generates a switching signal which, based on a control signal from the switching control device, switches over the facsimile signal coming from this switching control device by using a switching device, and sends the facsimile signal that is inputted through the above procedure is sent to a decision device inside a facsimile device. At the decision device, an identification signal that is contained in the facsimile signal that has been received and transferred at the switching device is judged, and when that decision result is satisfactory, the facsimile device is made to carry out an image receiving operation for the facsimile signal from the satellite communications circuit.

20 Claims, 6 Drawing Sheets

Fig. 4

MULTIPLE ADDRESSING FACSIMILE SYSTEM

TECHNICAL FIELD

The present invention relates to a facsimile communications system, in particular a multiple addressing facsimile system wherein a facsimile signal is transmitted to multiple terminals with various addresses. Also, the present invention relates to a reception system that is employed in a facsimile communications system which uses, for example, a satellite communications system having multiple audio channels on a single circuit.

BACKGROUND ART

Previously, as a multiple addressing facsimile system which used radio circuits, there was, for example, one which was recorded in Oki Denki Kenkyu Kaihatsu 137, Vol. 55 No. 1 (1 Jan. 1988) Pages 23–26, "Facsimile for Disaster Prevention Radio Communications System" by Gotoh, Hagiya, and Shimizu. This multiple addressing facsimile system was one which used ground wave radio circuits such as microwave circuits and quasi-milliwave circuits. This system comprised control stations installed in the respective regions, branch stations installed in each district inside the regions of these control stations, multiple terminal stations inside the respective districts, and relay stations which conducted the radio circuit relays between the branch stations and the control stations. In this system, a facsimile device for issuing commands was provided in the control stations, and a facsimile device for issuing commands and a facsimile for receiving commands were provided in each of the respective branch stations. Each of the respective terminal stations was provided with a facsimile device for receiving commands.

According to this multiple addressing facsimile system, it was possible to execute, by using the command facsimile device of the control station, a simultaneous command communication which simultaneously transmits a facsimile signal to all of the branch station facsimile devices and all of the terminal station facsimile devices, and the branch simultaneous command communications for the facsimile signals having, as their objective, all of the terminal stations of the respective branch stations, and the like.

However, in this type of a multiple addressing facsimile system, there were the following kinds of problems.

(a) In the case of transmitting a facsimile signal from the command facsimile device of the control station to the command receiving facsimile device of the respective terminal stations by using a radio circuit, the signal had to be transmitted to the respective terminal stations via the relay stations and the branch stations. As was mentioned above, at the branch stations, there was a necessity for a facsimile device used for issuing commands and receiving commands, and a device for the purpose of transmitting and receiving that facsimile signal by a radio circuit became necessary. Also, as for the relay stations, since there was a requirement for at least one or more stations within an line of sight communications distance in order to relay, for example, between the control station and the branch stations, in the prior multiple addressing facsimile system, there were the problems that the construction of the entire system became complicated due to relaying these, and that it was not economical.

(b) In the above mentioned multiple addressing facsimile system, there was the problem that when a facsimile signal was transmitted to multiple terminal stations using the radio circuits, it could not be operated in the mode wherein optional terminal stations were freely combined, since the system was a multiple group addressing system wherein the terminal stations were combined into a group unit, for example, a district unit.

Thus, the inventors of the present invention in this application, as a result of studying the case of the above mentioned (a), eliminated the branch stations and the relay stations by using existing satellite communications systems, and thought of conducting facsimile multiple address communications from the control station directly to the terminal stations.

However, in the existing audio visual (hereinafter written as AV) service which uses communications satellites, 2 channels are used as audio circuits which are used as a stereo or monaural broadcast circuit in response to the contents of the service. During stereo broadcasting, the left voice is transmitted on channel 1 (ch1), the right voice is transmitted on channel 2 (ch2), and during monaural broadcasts, the same voice signal is transmitted on both ch1 and ch2.

In this case, the communications satellite receiving device has a satellite receiving antenna, and a tuner used for satellite reception, an AV decoder, and an image receiver are connected to this antenna. With these kinds of devices, the satellite electromagnetic waves that are received from the satellite receiving antenna can be detected at the tuner used for satellite reception. This detected output is demodulated by the AV decoder into a video signal (image signal) using one channel and an audio signal using two channels (channel ch1, ch2), which are supplied to an AV monitor.

If an attempt is to be made to realize the above mentioned type of facsimile multiple addressing or facsimile broadcasting by using the AV service of this type of satellite communications circuit, the following two methods can be considered.

(1) The audio channel of the AV service consists of a monaural broadcast, for example, and service is provided by allocating channel ch1 to audio use, and channel ch2 to facsimile broadcast use.

(2) Besides audio channels ch1, ch2, for example, a channel ch3 is additionally provided, and service is provided by allocating channels ch1, ch2 to audio use, and channel ch3 to facsimile broadcast use.

However, in the case of configuring a facsimile reception system by using the above mentioned method (1), because the audio channel becomes a monaural system, the broadcast of stereo programs becomes impossible, and the quality of the AV service becomes extremely degraded. Also, in the case of configuring a facsimile reception system by using the above mentioned method (2), because service is provided by allocating channel ch3 to facsimile broadcast use on the transmitting side, the audio channel must be newly enlarged and installed in the communications satellite receiving device of the receiving side, and this places a big load on the receiving side. Therefore, even if facsimile multiple address service or facsimile broadcast service was provided by using the prior technology, it was difficult to offer a facsimile reception system that was

SUMMARY OF THE INVENTION

The purpose of the present invention is to provide a facsimile communications system which eliminates the defects of this type of prior technology, simply constructs a facsimile multiple address system, and which can conduct facsimile multiple address communications by freely combining the terminal stations to be addressed.

Also, another purpose is to provide a facsimile reception system, which is technologically and economically satisfactory, by using satellite communications.

According to the facsimile communications system of the present invention, the multiple addressing of the facsimile signal from the transmitting station is conducted via the satellite communications circuit. In this facsimile signal, a control signal for switching over the receiving station to facsimile reception and an identification signal for identifying to which of the receiving stations the signal is to be addressed are prefixed to the signal as a preamble. As for the receiving stations, the local stations are switched over to facsimile reception status by receiving this control signal, then decides whether or not to commence the receiving operation based on the identification signal.

In this case, in a receiving station where telephone circuits are connected to the facsimile device, the electromagnetic waves that are transmitted from the satellite communications circuit are received at the satellite communications receiver, and the receive output of this satellite communications receiver is sent to the switching control device. At the switching control device, the facsimile signal is sent to the facsimile device, based on the control signal. At the facsimile device, based on the control signal in the facsimile signal from the switching control device, switching is made from the telephone circuit to the satellite communications circuit by the switching means. Next, the facsimile device receives the identification signal and sends it to the decision means. At the decision means, the identification signal in the facsimile signal that has been switched over by the switching means is received, judged and when that decision result is satisfactory, image receiving operations for the facsimile signal from the satellite communications circuit are commenced.

Also, in the event the transmitting station transmits a transmission wave containing a voice signal in addition to a facsimile signal, the electromagnetic wave which comes from the satellite communications circuit is received at the satellite communications receiver at the receiving stations, and sent to the switching control device. At the switching control device, the voice signal and the facsimile signal are controlled to be switched based on the control signal, and the facsimile signal is sent to the facsimile device. At the facsimile device, the facsimile signal from the switching control device is received, and sent to the decision means in this facsimile device. At the decision means, the identification signal in the facsimile signal is judged, and when that decision result is satisfactory, image receiving operations for the facsimile signal from the satellite communications circuit are commenced.

In these facsimile communications systems, since identification information is contained in the facsimile signal that is sent from the transmitting station via a facsimile communications circuit, the number information and the specific number peculiar to the receiver are compared to make a judgement in the decision means in the facsimile device, and when these decision results match, the facsimile image reception operation is executed for the facsimile signal that has been transmitted via the satellite communications circuit. Therefore the identification information can be simply checked at the receiver side, and an accurate image reception operation for the facsimile signal can be accomplished.

In this case, as for the transmitting station, the identification information which is provided in the facsimile signal is divided into a number of groups, and by allocating a specific simultaneous multiple addressing meaning to each of the respective groups, various multiple addressing patterns can be configured, whereby the multiple addressing facsimile communication can be performed using combinations of the multiple addresses. Therefore, a huge economic effect can be anticipated in a construction such that satellite communications are operated in a multiple addressing configuration or a broadcast format, in the event the multiple addressing facsimile communications are conducted in various patterns.

On the other hand, according to the reception system of the present invention, the switching control device and the facsimile device conduct the switching operations based on the control signal that is transmitted from the transmitting side during facsimile broadcast. Then, at the switching control device, an audio signal that is sent from the receiving side is received. In this way, a stereo transmission service becomes possible except during the facsimile transmission time zone, and since the facsimile signal is received by being switching over from the audio signal, an enlarged installation of the audio channels at the receiver side becomes unnecessary. Also, since the facsimile device has a function of receiving input signals by switching between the telephone circuit and the switching control device, it can be as a common facsimile which can work with either the normal telephone circuit or the broadcast receiver for the facsimile.

For example, in the event the multiple channel audio circuits consists of two circuits, one of two audio channel circuits is used as the audio channel to receives an monaural signal, and the other audio channel is used to send the facsimile signal to be received by the facsimile device at the switching control device. This facsimile device is connected to the telephone circuit except during the facsimile broadcasting tone zone, and can be used for an ordinary facsimile communications.

BEST MODE FOR CARRYING OUT THE INVENTION

Next, an embodiment of a facsimile communications system in accordance with the present invention is explained in detail, referencing the appended figures.

Figure 1:
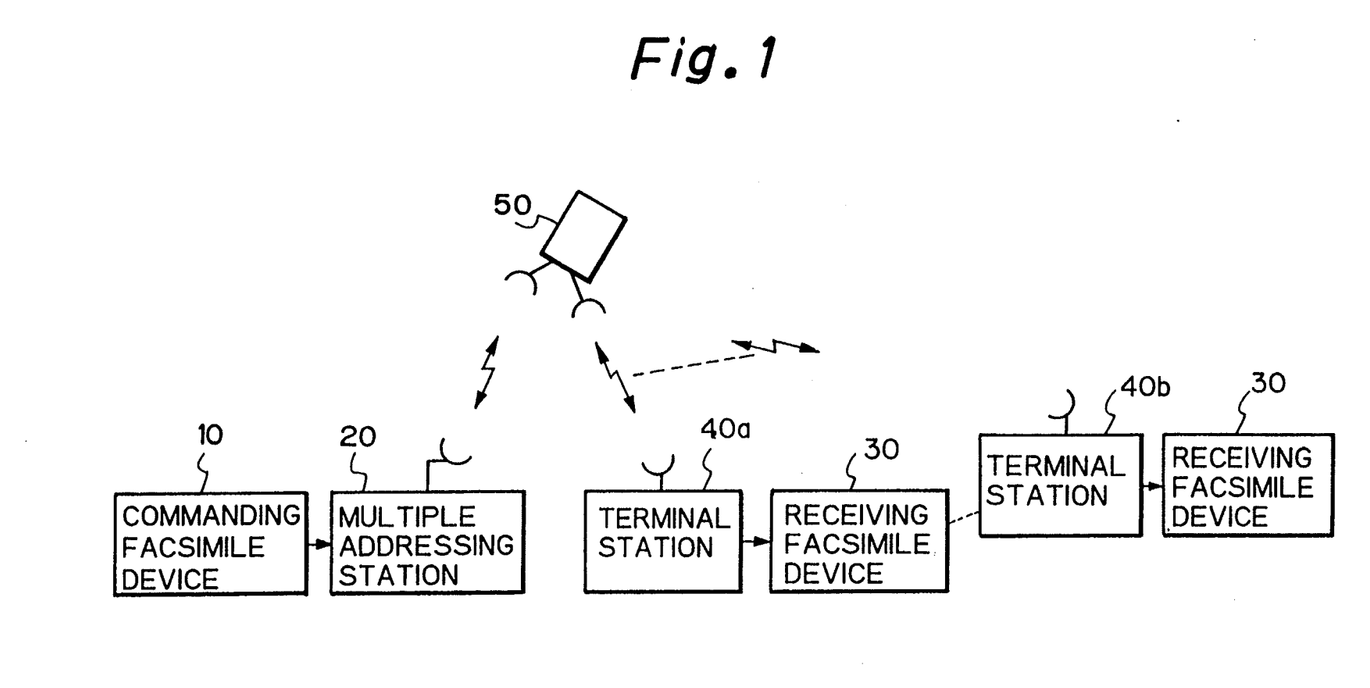
FIG. 1 is a system diagram which shows one embodiment of the facsimile multiple address system wherein a facsimile communications system based on the present invention is applied.

FIG. 1 shows one embodiment of the facsimile multiple addressing system wherein a facsimile communications system in accordance with the present invention is applied. The facsimile multiple addressing system comprises a multiple addressing station 20 equipped with a commanding facsimile device 10, terminal stations 40a, 40b - - -, provided with their respective command reception facsimile devices 30, and a communications satellite 50 which relays the facsimile signal from the multiple addressing station 20.

The multiple addressing stations 20 are satellite communications ground stations that are installed in their respective regions, and are transmitting stations which transmit facsimile signals from commanding facsimile device 10 using the satellite communication transmitter. These multiple addressing stations 20 transmit a facsimile signal as shown FIG. 2. As is shown in this figure, this facsimile signal comprises a control signal for switching over terminal stations 40a, 40b - - - to the facsimile signal from the satellite circuit, and an identification signal which identifies which of the terminal stations 40a, 40b - - - is to be addressed. This number information N, which is this identification signal, is transmitted in every page before image signal M is sent out. As for the other information used for image receiving, the protocol elements of the CCITT Recommendation T. 30, which is used, for example, with the standard G3 facsimile, is employed as is. However, because of the communications configuration of the broadcast format, the response signal from the receiver side to the transmitter side is eliminated.

Figure 2:
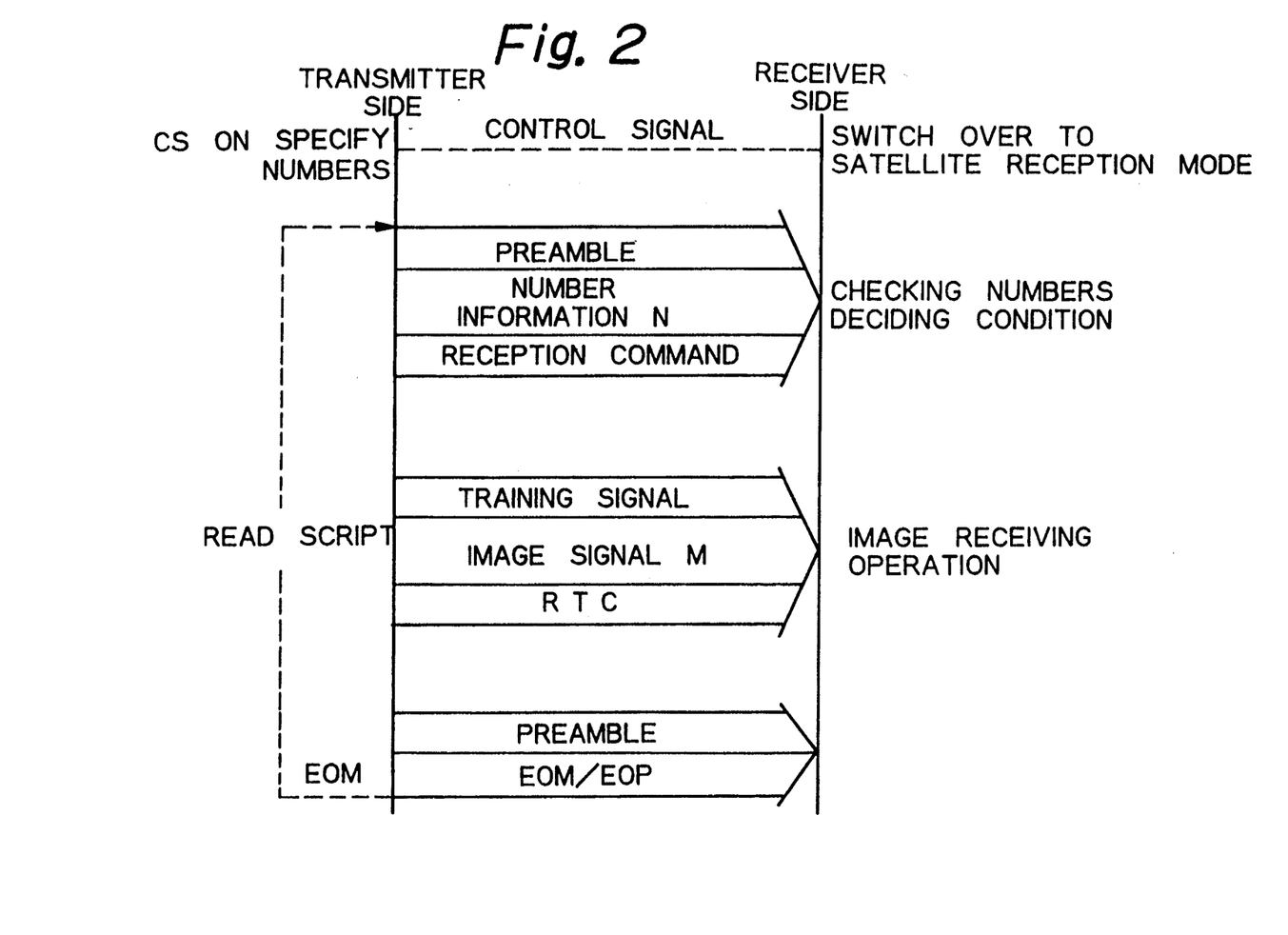
FIG. 2 is a sequence diagram which shows the communications sequence of this same embodiment.
Figure 3:
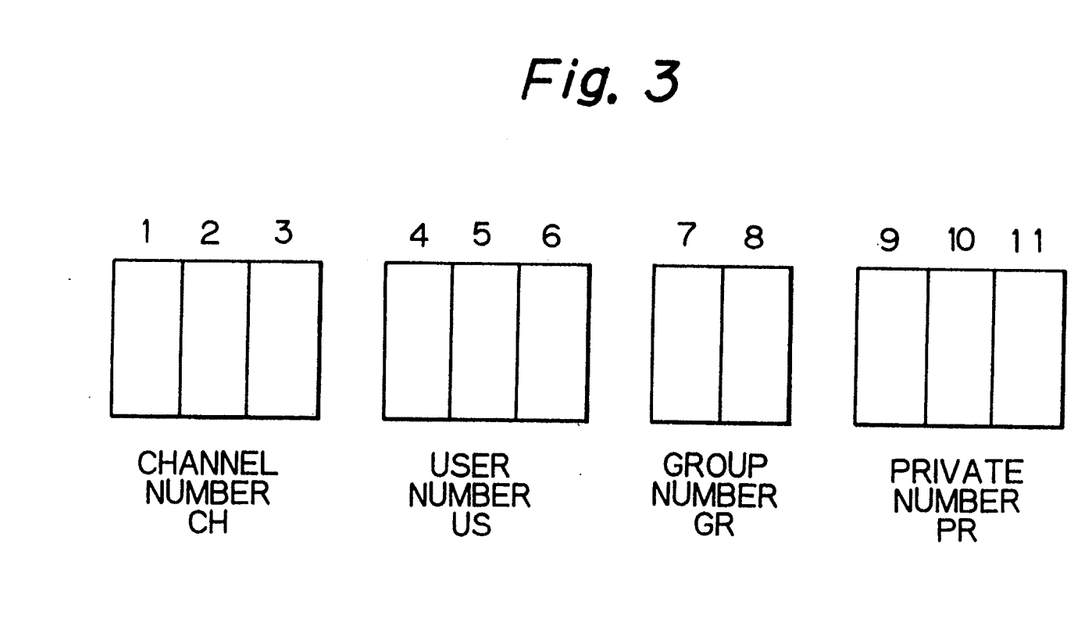
FIG. 3 is a drawing which shows the configuration of number information for the purpose of performing the receiver decision in this same embodiment.

FIG. 3 is a drawing which shows a configuration example of the number information in the facsimile signal of FIG. 2 that is transmitted from multiple addressing station 20. As for this number information N, the 11 digit number is divided into the four groups of CH, US, GR, and PR, to each of which a specific meaning of the simultaneous multiple addressing is allocated. For example, channel number CH is allocated to digit 1–digit 3, user number US is allocated to digit 4–digit 6, group number GR is allocated to digit 7 and digit 8, and private number PR is allocated to digit 9–digit 11. By suitably combining this type of number information, multiple address communications of various combinations, from private transmissions to simultaneous multiple address communications, becomes possible.

In the present embodiment, for example, there are the following four combinations.

(1) In the event all of the numbers of digits 1 to 11 are matched at any of the terminal stations terminal stations 40a, 40b - - -, only the terminal stations (40a, 40b - - -) with the same number can begin the image receiving operation at this time. In this case, a specific number is set up in each terminal station or receiver, and used for the private communications.

(2) In the event that all of the numbers of digits 1 to 8, except for digits 9 to 11, are matched at the terminal stations, and the numbers of digit 9 to 11 are "999", this combination is used for the simultaneous multiple address communications within the group indicated by digits 1 to 8. In other words, a simultaneous transmission is made to the facsimile devices of multiple terminal stations (40a, 40b - - -) within these groups.

(3) In the event all of the numbers of digits 1 to 6 are matched at the terminal stations, and the numbers of the transmitter side for digits 7 to 11 are "99 999," this combination is used for simultaneous multiple address communications within the users designated by digits 1 to 6.

(4) In the event the numbers of all of the digits 1 to 3 are matched at the terminal stations, and the transmission side numbers for digits 4 to 11 are "999 99 999," this combination is used for simultaneous multiple address communications within the channel designated by digits 1 to 3.

In other words, in these combinations of (1) to (4), the numbers "999" and "99" are handled as specific numbers, and by giving them a meaning for simultaneous multiple addressing designations, various combinations of multiple addressing patterns can be assembled. In this instance, "999" and "99" are left out of the specific numbers that are allocated to each terminal station.

Returning to FIG. 1, as for the communications satellite 50, an existing geostationary satellite station, for example, that can provide audio visual (AV) service can be used. This communications satellite 50 has at least two channels, ch1 and ch2, in the audio circuit. These are used as circuits for a stereo or monaural broadcast program, in response to the service contents. During stereo broadcasting, the left voice (L) is sent on channel 1 (ch1), and the right voice (R) is sent on channel 2 (ch2). During monaural broadcasting, the same voice signal is sent on both channel ch1, ch2. Of course, a video circuit is also provided.

Figure 4:
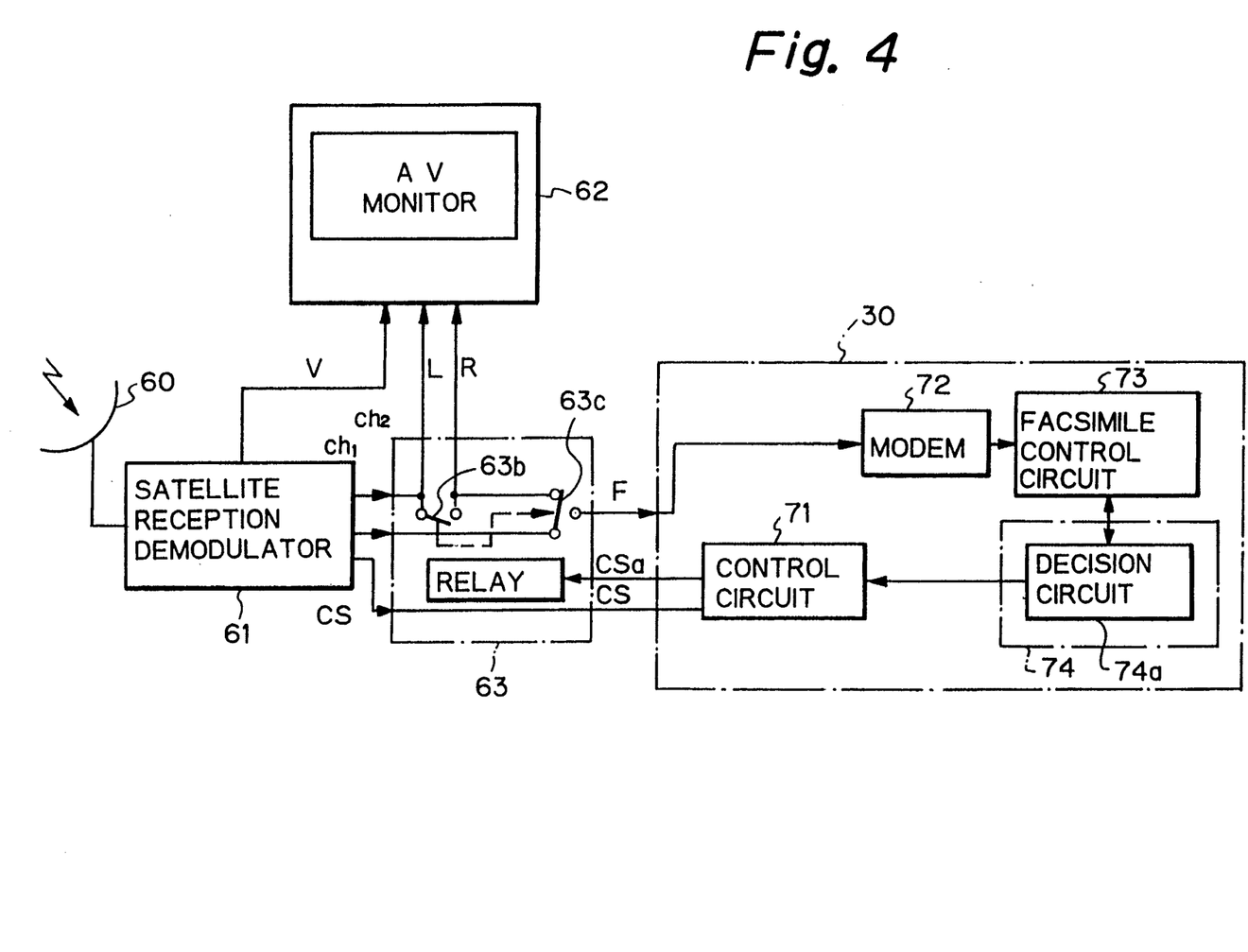
FIG. 4 is a block diagram which shows the circuit configuration of a terminal station in this same embodiment.

The terminal stations 40a, 40b - - - are the respective earth stations which receive the electromagnetic waves from communications satellite 50, and as is shown in FIG. 4, have a satellite receiving antenna 60, which receives the electromagnetic waves that are sent via the satellite communications circuit, and an AV monitor 62, such as on image receiving, and a switching control device 63 are connected to its output side via a satellite receiver demodulator 61. Furthermore, the facsimile device 30 is connected to the output side of a switching control device 63.

The satellite receiver demodulator 61 has functions to decode the output of satellite receiving antenna 60 into a video signal V, audio channels ch1 and ch2, and a control signal CS, supply this video signal V to AV monitor 62, and also supply the signals in audio channels ch1 and ch2, and control signal CS, to switching control device 63.

The switching control device 63 provided with a switching relay 63a, which operates according to control signal CS, and its switching contacts 63b, 63c, is a circuit which switches over the audio input signals of channels ch1, ch2 through switching contacts 63b 63c, thereby supplying the signals for left voice L and right voice R to AV monitor 62, as well as supplying a facsimile signal F to facsimile device 30. This switching control device 63 has the function for transferring the inputted a control signal CS to facsimile device 30.

The facsimile device 30 is equipped with a control circuit 71 which creates a switching signal CSa for controlling switching relay 63a of switching control device 63, a modem 72 which receives the facsimile signal via switching control device 63 and demodulates it, a facsimile control circuit 73 which controls the facsimile image receiving operation, and decision means 74 which receives the identification signal and decides whether or not to perform the image receiving operation. The control circuit 71 outputs a control signal CSa to switching relay 63a based on the control signal CS from switching control device 63.

The modem 72 is a demodulating circuit which demodulates the facsimile signal from switching control device 63 and supplies it to facsimile control circuit 73. The facsimile control circuit 73, in addition to performing all of the controls of the facsimile device referred to as data compression/expansion, read out of input manuscript, printing of the image signal, etc., it has the function of extracting number information N from the output of modem 72 and sending it to decision means 74, and consists of a control processing unit (hereinafter called CPU) and the like. The decision means 74 comprises a decision circuit 74a, which compares number information N from facsimile control circuit 73 to the specific number peculiar to the receiver that has been set up beforehand, decides the reception condition, and based on the results of this decision, controls the image receiving operation for the facsimile signal that has been received. This decision circuit 74 is made to also control the control circuit 71a.

The operation of the facsimile multiple addressing system that is constructed as in the above is explained while referencing FIG. 1 and FIG. 4.

In the event of conducting multiple address facsimile communications, if an electromagnetic wave is sent from the multiple addressing station 10 side via communications satellite 50, this electromagnetic wave is received at terminal stations 40a, 40b - - - by satellite receiving antenna 60, and is decoded into a video signal V, audio channels ch1, ch2, and a control signal CS by satellite receiving demodulator 61. The video signal V is sent to AV monitor 62, and audio channels ch1, ch2 and the control signal CS are sent to switching control device 63. At switching control device 63, switching relays 63b, 63c are caused to switch over, due to the control signal CSa from control circuit 71, and audio channels ch1, ch2 are switching controlled. Then, the left voice L and right voice R of the audio signal are sent to AV monitor 62 via switching contacts 63b, and lastly, a facsimile signal F is sent to modem 72 of facsimile device 30 via switching contacts 63c.

At control circuit 71 inside facsimile device 30, when a control signal CS from switching control device 63 is received, a decision is made about the receiving conditions as to whether reception is possible, in addition to outputting a control signal CSa to switching relay 63a. If the receiving conditions are compatible, switching contacts 63c are placed in the ON condition, a facsimile signal F is supplied from switching control device 63 to modem 72, and is demodulated at that modem 72. As for the demodulated data, number information N is extracted by facsimile control circuit 73, and sent to decision circuit 74a.

At decision circuit 74a, a decision is made as to whether conditions are arranged to begin the image receiving operation, based on the number information N. If the conditions at decision circuit 74a are compatible, facsimile control circuit 73 receives the receive command signal from the transmit side, and proceeds to begin the image receiving operation for Page 1. At facsimile control circuit 73, when an image signal M for Page 1 is completed, it receives an end of message signal EOM or an end of procedure signal EOP, and begins the next operation. In the event message end signal EOM is received, the number information N is again received for receiving the next page and judged, and the image receiving operation is begun. In the event the end of procedure signal EOP is received, the receive stop operation is begun.

Next, an explanation is given in regard to the decision method for the number information N while referencing FIG. 3. As for the number information N of FIG. 4, since the 11 digit number is divided into the four groups of CH, US, GR, and PR, the decision method is explained based on that.

At decision circuit 74a inside facsimile device 30, the 11 digit number that is sent from multiple address station 10 and the 11 digit number of terminal stations 40a, 40b - - - that have been set up beforehand are compared, and if conditions match, it can begin the image receiving operation, but if conditions do not agree, it does not begin the image receiving operation, and goes into a standby condition. For example, in the even digits 1 to 11 match all of the numbers of the local stations, it begins the image receiving operation, and conducts individual reception for only the addressed local stations.

In the event the numbers of digits 9 to 11 are "999," if a local station belongs to the group designated by digits 1 to 8, in other words, in the event all of the numbers of digits 1 to 8 are matched by the numbers of the local stations that were set up beforehand, the image reception operation is begun, and simultaneous multiple address communications within the group can be conducted. At this time, the same facsimile signal is received at terminal stations 40a, 40b - - - within the group. Also, in the event the numbers for digits 7 to 11 of the transmitter side are "99 999," if the local stations are pertinent to the user numbers designated by digits 1 to 6, in other words, if all of the numbers of digits 1 to 6 are matched, they begin the image receiving operation, and simultaneous multiple address communications can be conducted within the same user group. Lastly, in the event the numbers for digits 4 to 11 of the transmitter side are "999 99 999," the stations where all of the numbers of digits 1 to 3 are matched, in other words, all of the terminal stations 40a, 40b - - - within the channel designated by digits 1 to 3, simultaneously begin the image receiving operation, and simultaneous multiple address communications can be conducted.

As was presented above, according to the present embodiment, switching control device 63 and facsimile device 30 are provided in the respective terminal stations 40a, 40b - - -, and the number information N in the facsimile signal F sent from multiple addressing station 10 is judged in decision circuit 74a within this facsimile device 30, whereby multiple address communications for the facsimile signal F can be conducted with a simple system construction. Moreover, by assembling multiple addressing patterns of various combinations by using the number information N, facsimile multiple address communications of various patterns can be economically realized.

Figure 5:
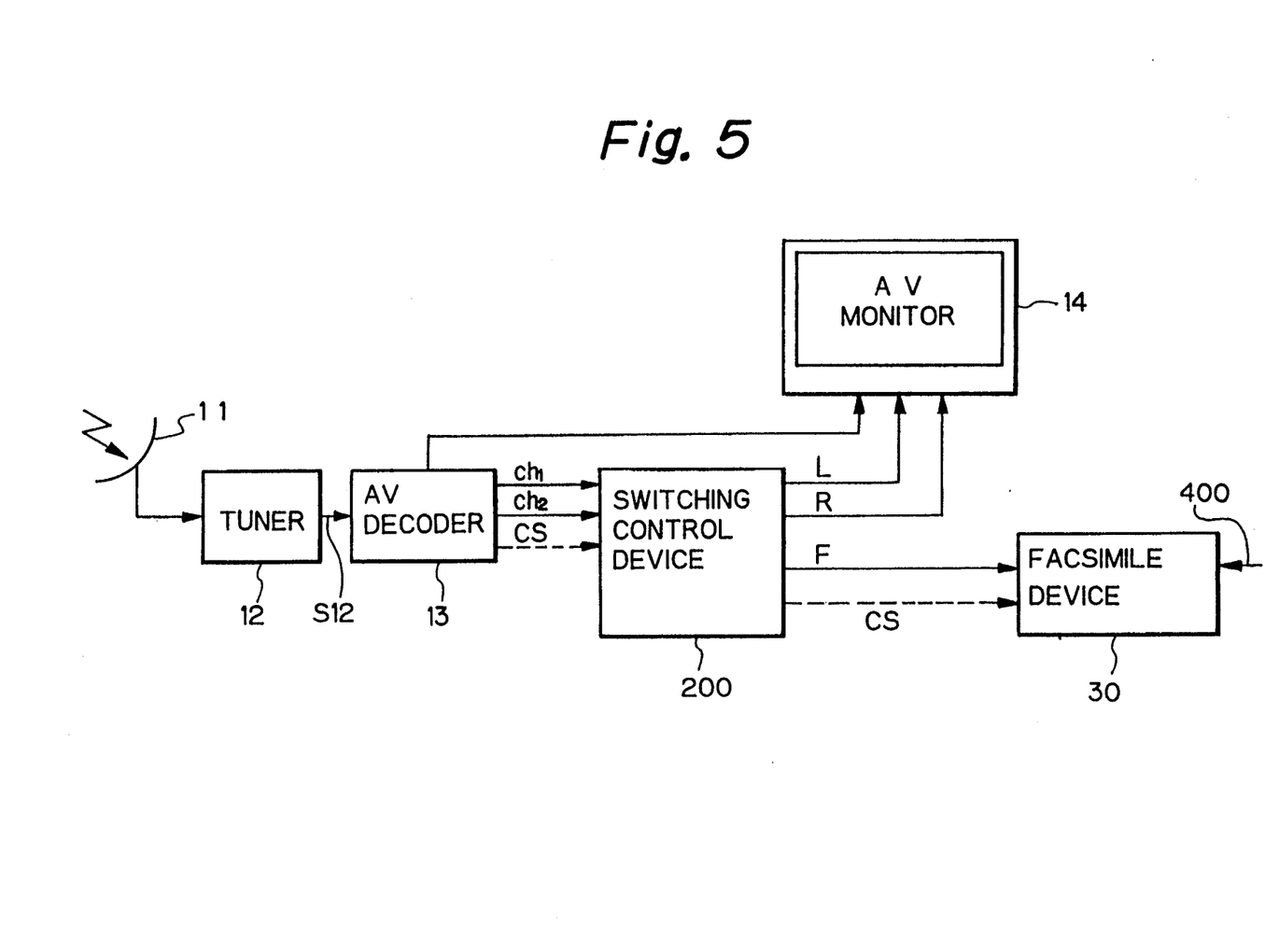
FIG. 5 is a block diagram which shows an alternative embodiment of a terminal station in this same embodiment.
Figure 6:
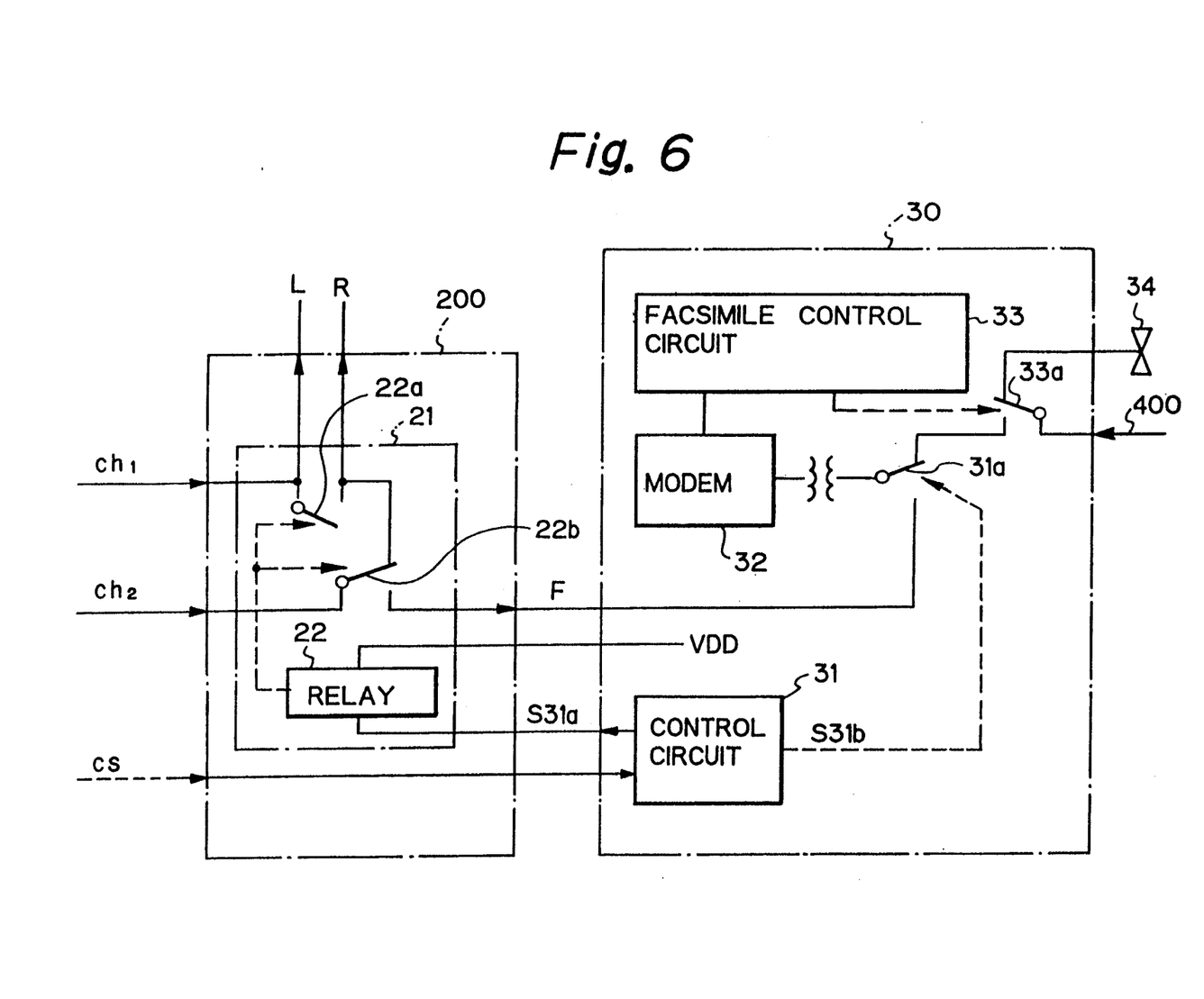
FIG. 6 is a block diagram which shows the essential section of the terminal station of FIG. 5.

FIG. 5 and FIG. 6 are diagrams which show an alternative embodiment of terminal stations 40a, 40b - - - in the present system embodiment.

As for these terminal stations 40a, 40b - - -, a telephone circuit 400 is connected to facsimile device 30. Also, in the case of this example, the signal which comes from the satellite circuit is sent, for example, as a scrambled signal by using a spectrum diffusion system. Therefore, AV decoders 13 are provided in the receivers of these terminal stations 40a, 40b - - -. This AV decoder 13 has functions to accept the detected output S12 of a tuner 12, and decode this detected output S12 in order to enable reception only by parties with a specific contract, into a video signal V, audio channels ch1, ch2, and a control signal CS. At the output side of this AV decoder 13, along with an AV monitor 14 being connected, facsimile device 30 is connected via switching control device 200. The AV monitor 14 has the function of outputting the image display and the voice.

The switching control device 200 has the function of switch controlling audio channels ch1, ch2, and also has functions of connecting the audio channels for left voice L and right voice R to AV monitor 14 and connecting the transferred facsimile signal F to facsimile device 30, along with the function of supplying the inputted control signal CS to facsimile device 30.

The facsimile device 30 has functions to perform switching control between the facsimile signal F from switching control device 200 and the signal from telephone circuit 400 based on the control signal CS, and to receive the switched signal.

The switching control device 200, as is shown in FIG. 6, has a switching circuit 21 which conducts the switching operation by using a switching signal S31a. The switching circuit 21 has a switching relay 22, which operates according to the switching signal S31a, and its switching contacts 22a, 22b. This circuit switches over the audio input signals of channel 1 and channel 2 at these switching contacts 22a, 22b and supplies them as left voice L and right voice R, to AV monitor 14 and also, supplies the facsimile signal F to facsimile device 30. In this case, since the internal impedance of the audio output circuit in AV monitor 14 is sufficiently low, and furthermore, the output impedance of the audio input circuit of AV monitor 14 is sufficiently high, the shock and the level fluctuations during switching operation of switching contacts 22a, 22b can be mostly ignored.

The facsimile device 30 has a control circuit 31 which creates the respective switching signals S31a, 31b based on the input of the control signal CS. One of its switching signals S31a controls switching relay 22 of switching control device 200, which is driven by D.C. power source + VDD, and its other switching signal S31b controls the ON and OFF of switching contact 31a. The switching contact 31a has functions to make a switch between the facsimile signal F from switching control device 20 and the facsimile signal from telephone circuit 400, and send the switched facsimile signal to a modem 32.

The modem 32 is a circuit which demodulates the facsimile signal from switching contact 31a, and also, modulates the facsimile signal which is transmitted from this device 30, and facsimile control circuit 33 is connected to this modem 32. Facsimile control circuit 33 is the circuit which controls the data compression/expansion, the read out of the input manuscript, and the printing of the facsimile signal and so on, and comprises a CPU and such. Also, a switching contact 33a, which switches ON and OFF according to the control of facsimile control circuit 33, is connected to switching contact 31a. The switching contact 33a has the function of switching over telephone circuit 400 between the switching contact 31a side and the telephone receiver 34 side.

In the present embodiment, the switching contact 31a is placed in the make connection with facsimile signal F condition based on the control signal CS that is inputted via switching control circuit 200, and supplies the inputted facsimile signal to modem 32 via switching control circuit 200. Also, in a condition other than receiving a facsimile signal from the satellite circuit, in other words, in a condition wherein control signal CS is not being received, this facsimile device 30 operates as an ordinary facsimile device, and facsimile transmission and reception can be realized via a telephone circuit 400, because switching contact 31a inside facsimile device 30 is connected to the telephone circuit 400 side. During facsimile operation via this telephone circuit 400, switching contact 33a between telephone receiver 34 and facsimile device 30 is held in a make connection to modem 32 condition to connect telephone circuit 40 to modem 32.

Also, in the present embodiment, by combining switching control device 200 and facsimile device 30 as was presented above, during facsimile reception by a satellite circuit, the channel the ch1 is outputted as an audio channel as a monaural signal to AV monitor 14, and the channel ch2 is outputted as a facsimile signal F to facsimile device 30. In this way, the reception of stereo broadcast service is possible, except for the time period of facsimile reception by satellite circuit. Moreover, it is unnecessary to additionally install an audio channel at the receiver side, and multiple addressing facsimile communications for transmitting a facsimile signal to multiple terminal addresses by existing satellite AV circuits can be realized at low cost. Also, the facsimile device 30 is connected to telephone circuit 400 except during facsimile reception by satellite circuit, and ordinary facsimile communications which use this telephone circuit 400 can be utilized.

Now then, the present invention is not limited to the above mentioned embodiment, and various alternatives are possible. As one example of these alternatives, for example, there is one like the following.

(1) In FIG. 6 and FIG. 4, the switching control devices 200 and 63, respectively comprised switching relays 22 and 63a and switching contacts 22a, 22band 63a, 63b, respectively, may comprises transistor circuits and the like. Also, the control circuits 31, and 71 which control switching relays 22, and 63, respectively were provided in facsimile device 30, but these control means can also be provided in switching control devices 200 and 63, respectively.

(2) In the facsimile device shown in FIG. 6, switching contact 31a may comprise an electronic switch which uses transistors and such, and in the same manner, switching contact 33a also can comprise an electronic switch which uses transistors and such.

(3) In FIG. 4, it is also possible to devise simplification of the circuit construction by providing control circuit 71 and decision circuit 74 inside facsimile control circuit 73.

(4) As for the protocol of FIG. 2, protocol of another configuration can be used, and lastly, various other configurative alternatives are possible, such as the constructing number information N of FIG. 3 with use of a number of digits other than 11 digits, or its number of division groups can be a number other than four, and so on.

Industrial Applicability

The present invention can be applied to a facsimile communications system, specifically, to the facsimile multiple addressing system which simultaneously transmits a facsimile signal to multiple terminal destinations. Also, the present invention can be applied to a broadcast which has multiple audio circuits, for example, one which uses a satellite communications system. According to the present invention, multiple addressing of a facsimile signal from a transmitting station is done via a satellite communications circuit. In this facsimile signal, a control signal for switching over the receiving station to facsimile reception and an identification signal for identifying to which of the receiving stations the signal is addressed are prefixed as prefix information. The receiving stations switches itself to the facsimile reception status by receiving this control signal, then decides whether to commence the receiving operation based on the identification signal. In a receiving station where the facsimile device is connected to a telephone circuit, it is connected to that telephone circuit, and ordinary facsimile communications can be conducted, other than during facsimile reception from a satellite circuit.

We claim:

1. A facsimile communications system wherein a facsimile signal of the same content is simultaneously transmitted to multiple terminal stations, comprising
    a transmitting station for transmitting a facsimile signal via a satellite communications circuit, and multiple receiving stations for receiving electromagnetic waves from the satellite communications circuit,
    wherein, at the time of transmitting said facsimile signal to said receiving stations via the satellite communications circuit, said transmitting station transmits a prefix information comprising a control signal for switching said receiving stations to facsimile reception and an identification signal for identifying which of said receiving stations the facsimile signal is addressed to, and
    said receiving stations receive said control signal from said transmitting station and switch to a configuration for facsimile reception from said satellite communication circuit, receive the identification signal, and said receiving stations designated by said identification signal conduct a facsimile receiving operation.

2. A facsimile communications system in accordance with claim 1, wherein
    each said receiving station comprises a communications receiver for receiving the electromagnetic waves from said satellite communications circuit, a switching control device for accepting an output of said satellite communications circuit and for outputting a facsimile signal and for accepting the control signal for a switch-over control operation, and a facsimile device coupled to said switching control device and to a telephone circuit,
    wherein said facsimile device is provided with a switching means for switching between the facsimile signal and a signal from the telephone circuit based on the control signal, and a decision means which controls the facsimile receiving operation by determining the identification signal in the facsimile signal that has been received and transferred by said switching means.

3. A facsimile communications system in accordance with claim 2, wherein
    said decision means compares the identification information represented in the identification signal in the facsimile signal to a specific number peculiar to the receiving station that has been set up beforehand, makes a decision, and controls the facsimile receiving operation for the facsimile signal based on the results of the decision.

4. A facsimile communications system in accordance with claim 3 wherein
    said identification information is divided into multiple groups, and a specific meaning for the simultaneous multiple addressing is allocated to each of the respective groups.

5. A facsimile communications system in accordance with claim 1, wherein
    said transmitting station conducts multiple address communications by a transmission wave containing, besides the facsimile signal, a voice signal,
    each of said receiving stations comprising a satellite communications receiver for receiving the electromagnetic waves transmitted from said satellite communications circuit, a switching control device for accepting an output of the satellite communications receiver and controlling a switching operation between the voice signal and the facsimile signal based on the control signal, and a facsimile device for receiving the facsimile signal switched by said switching control device,
    wherein said facsimile device comprises a decision means for controlling the facsimile receiving operation by determining the identification signal in the facsimile signal.

6. A facsimile communications system in accordance with claim 5, wherein
    said decision means compares the identification information represented by the identification signal in the facsimile signal to a specific number peculiar to the receiving station that has been set up beforehand, makes a decision, and controls the facsimile receiving operation for the facsimile signal based on the result of the decision.

7. A facsimile communications system in accordance with claim 6, wherein
    said identification information is divided into multiple groups, and a specific meaning for the simultaneous multiple addressing is allocated to each of the respective groups.

8. A facsimile communication system in accordance with claim 1, wherein
    said satellite communications circuit comprises multiple audio channels, and
    wherein said transmitting station transmits a facsimile signal by using any of the channels among the multiple audio channels in the satellite communications circuit.

9. A facsimile communications system according to claim 8, comprising
    a receiver device for receiving the multiple audio channels transmitted via the satellite communications circuit;
    a switch means, coupled to the receiver device, for selecting among the multiple audio channels on a switching basis;
    a facsimile device for receiving the facsimile signal coupled through the switch means;

wherein the switch means coupling any of the multiple audio channels received by the receiver device to the facsimile device on the basis of the control signal transmitted from the transmitting station, so that the facsimile device receives the facsimile signal through the coupled audio channel.

10. A reception system for receiving signals sent via a communications circuit having multiple audio channels, comprising a facsimile device for receiving a facsimile signal coupled to a receiver device through a switching means, the receiver device receiving the multiple audio channels and the switching means switching among the multiple audio channels for selecting at least one audio signal sent via the communications circuit, said switching means coupling any of the multiple audio channels received by said receiver device to said facsimile device on the basis of a control signal contained in a signal received by said receiving device, so that said facsimile device receives the facsimile signal through said coupled audio channel.

11. A reception system in accordance with claim 10, wherein said facsimile device further comprises a control means for generating a switching signal for controlling the switching of said switching means.

12. A reception system in accordance with claim 11, wherein said facsimile device is coupled to a telephone circuit, and said control means generates said switching signal for selecting between a facsimile signal from the telephone circuit and the facsimile signal from the coupled audio channel based on the control signal contained in the signal sent via said switching means.

13. A reception system in accordance with claim 10, wherein said communications circuit having the above mentioned multiple audio channels is a satellite communications circuit.

14. A facsimile communication system, comprising:

a receiver for receiving a facsimile signal from a satellite and outputting an output facsimile signal, the output facsimile signal including a control signal and an identification signal;

a first switching circuit, coupled to an output of the receiver, for switching the output facsimile signal;

a facsimile device coupled to the first switching circuit; and a control circuit coupled to the receiver and responsive to the control signal for controlling the first switching circuit to switch the output facsimile signal to the facsimile device, and for controlling a facsimile operation of the facsimile device when the received identification signal designates the facsimile device.

15. The facsimile communication system according to claim 14, further comprising a second switching circuit coupled between the first switching circuit and the facsimile device and coupled to a telephone circuit, wherein the control circuit is responsive to the control signal for controlling the second switching circuit to switch the output facsimile signal to the facsimile device.

16. The facsimile communication system according to claim 14, wherein the control circuit controls the facsimile operation of the facsimile device when the received identification signal matches a predetermined identification signal associated with the facsimile device.

17. The facsimile communication system according to claim 14, wherein the receiver further receives a voice signal.

18. The facsimile communication system according to claim 14, wherein the receiver further receives a plurality of audio channels, one audio channel of the plurality including the facsimile signal, wherein the first switching circuit is coupled to the plurality of audio channels and to the facsimile device, and wherein the control circuit controls the first switching circuit to switch the audio channel which includes the facsimile signal to the facsimile device.

19. The facsimile communication system according to claim 18, further comprising a second switching circuit coupled between the first switching circuit and the facsimile device and coupled to a telephone circuit, wherein the control circuit is responsive to the control signal for controlling the second switching circuit to switch the audio channel including the facsimile signal to the facsimile device.

20. The facsimile communication system according to claim 14, wherein the identification signal includes information representing a predetermined group of facsimile devices.

* * * * *